(12) United States Patent
Lacaze

(10) Patent No.: US 7,508,107 B2
(45) Date of Patent: Mar. 24, 2009

(54) HIGH CURRENT ROTATING EXCITER

(75) Inventor: Alain Lacaze, Essert (FR)

(73) Assignee: Alstom Technology Ltd, Baden (CH)

( * ) Notice: Subject to any disclaimer, the term of this patent is extended or adjusted under 35 U.S.C. 154(b) by 456 days.

(21) Appl. No.: 11/393,541

(22) Filed: Mar. 30, 2006

(65) Prior Publication Data

US 2007/0013243 A1 Jan. 18, 2007

(30) Foreign Application Priority Data

Mar. 31, 2005 (CH) .................... 0585/05

(51) Int. Cl.
*H02K 17/16* (2006.01)
(52) U.S. Cl. .................. 310/211; 310/68 R; 310/201; 310/179
(58) Field of Classification Search ........... 310/68 R, 310/72, 201, 211, 179; 318/237, 241
See application file for complete search history.

(56) References Cited

U.S. PATENT DOCUMENTS

| | | | | |
|---|---|---|---|---|
| 2,966,623 A * | 12/1960 | Mishkin | ...... | 318/148 |
| 3,686,523 A | 8/1972 | Gorden et al. | ...... | 310/72 |
| 3,810,253 A | 5/1974 | Vergara et al. | ...... | 318/237 |
| 4,393,344 A * | 7/1983 | Whellams | ...... | 318/759 |
| 4,500,826 A * | 2/1985 | Espinosa et al. | ...... | 318/820 |
| 4,532,447 A * | 7/1985 | Cibie | ...... | 310/114 |
| 5,187,426 A * | 2/1993 | Maass et al. | ...... | 322/63 |
| 5,493,200 A * | 2/1996 | Rozman et al. | ...... | 322/10 |
| 5,519,275 A * | 5/1996 | Scott et al. | ...... | 310/112 |
| 2002/0047455 A1* | 4/2002 | Dhyanchand et al. | ...... | 310/211 |
| 2003/0075997 A1* | 4/2003 | Keim et al. | ...... | 310/68 D |
| 2005/0162030 A1* | 7/2005 | Shah et al. | ...... | 310/165 |

FOREIGN PATENT DOCUMENTS

| | | |
|---|---|---|
| CH | 373460 | 11/1963 |
| CH | 496 347 | 9/1970 |
| DE | 1 059 113 | 6/1959 |
| EP | 0 434 666 A1 | 6/1991 |
| FR | 2 438 936 | 5/1980 |

OTHER PUBLICATIONS

International Search Report for CH 00585/05 (4 pages).

* cited by examiner

*Primary Examiner*—Thanh Lam
(74) *Attorney, Agent, or Firm*—Darby & Darby

(57) ABSTRACT

A rotor for an exciter to be used to energize the field winding of a generator-rotor of a generator, the rotor defining an axis and including at least two conductor bars aligned substantially parallel to the axis. The bars are connected on their first axial end to one of a plurality of collecting ring and on their second axial end individually to one of two rings. By means of at least one diode the flow of current in each bar is allowed in only one direction such that an alternating current induced in the conductor bars due to a static field is converted into a direct current in the two rings.

30 Claims, 12 Drawing Sheets

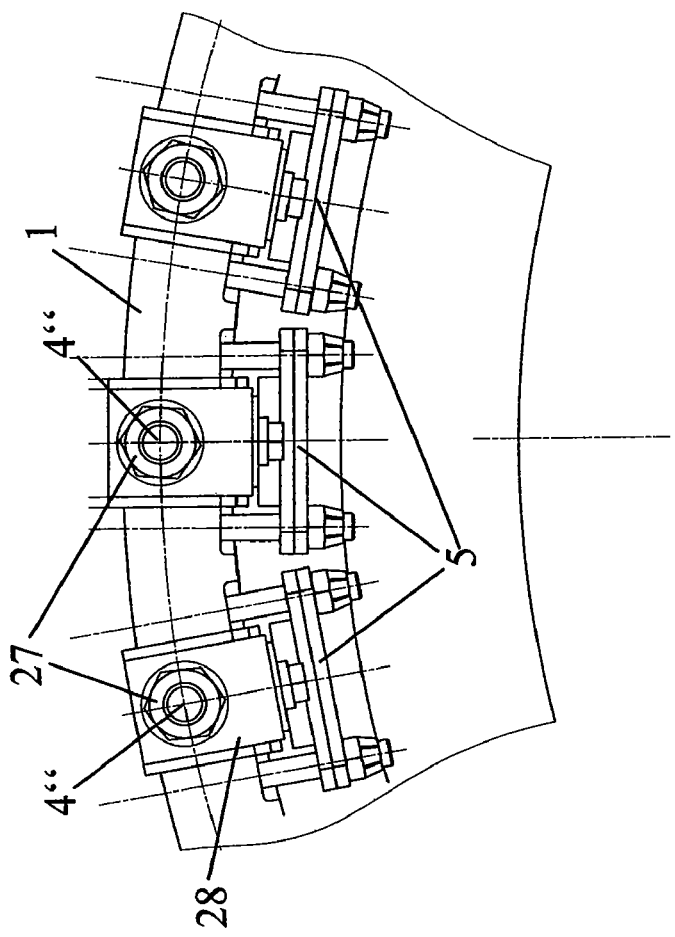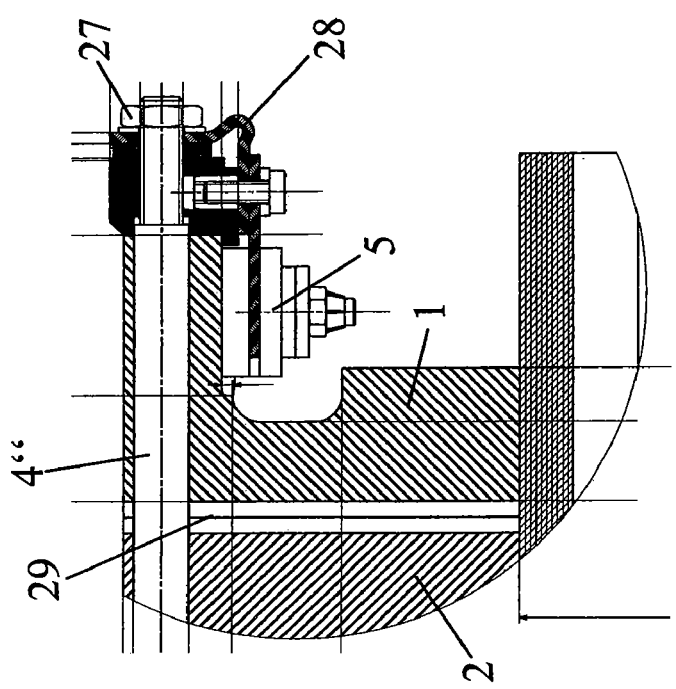
Fig. 9

HIGH CURRENT ROTATING EXCITER

Priority is claimed to Swiss Patent Application No. CH 00585/05, filed on Mar. 31, 2006, the entire disclosure of which is incorporated by reference herein.

The present invention relates to the field of excitation devices for generators. It more particularly relates to a rotor for a brushless exciter to be used to energise the field winding of a rotor of a generator. It furthermore relates to a brushless exciter using such a rotor.

BACKGROUND

A synchronous machine is a dynamoelectric machine, which may be utilized as a motor for driving a shaft or any load at a constant speed or as a generator for producing a voltage at a predetermined frequency depending on the speed of the driving shaft. When the device is used as a synchronous generator, it is customary to e.g. provide field excitation for the rotor through a synchronous brushless exciter generator. The exciter generator converts the direct current (DC) stator field into a polyphase alternating current (AC) armature voltage, which is rectified by a set of rotating rectifiers mounted on or within the driving shaft to provide the DC excitation for the field windings of the synchronous generator, i.e. for the rotor of the generator.

Thus, a rotating exciter is a reversed generator with the field winding, fed with DC current, implemented on the static parts. The armature is located on the rotating part and produces AC voltage. A set of parallel diodes with reversed polarity is used to rectify it to produce a DC current, required to energise the field winding of the synchronous machine, i.e. the rotor.

As an order of magnitude, the power generated by the exciter is 0.5 to 2% of the rated power of the synchronous machine. Because the rotating exciter is a generator, this power could as well be made available with low, medium or high voltage. The voltage/current balance is chosen to best fit the available diodes characteristics. In principle the limitation in output current, due to the available diodes, can be overcome by setting two or more diodes in parallel. Actually this would result in a strong overload on diodes, and therefore the need for a heavy down-rating of them.

Nowadays, usually rotors operate at speeds of 3000 rotations per minute, leading to currents in the range of 2000 Ampere for energising the field winding of the synchronous machine. Usually the synchronous machine cannot be operated at higher rotational speeds due to a number of limitations such as instability of the shaft as well as high centrifugal forces on the rotating parts. In power generation, at a specified output, an increase of the rotary speed of a turbine however is associated with a decrease in size and costs. Efficiency, too, can be improved. Therefore power generation turbines up to 70 MW are already connected to generators by way of gearing arrangements, so as to allow operation at higher rotary speeds. Consequently, there is a need for rotors for exciters that can be operated at high rotational speeds, which usually means lightweight construction, smaller diameter as well as longer dimension in axial direction and at the same time high stability with respect to centrifugal forces.

SUMMARY OF THE INVENTION

An object of the present invention is to provide an improved rotor for an exciter to be used to energise the field winding of a rotor of a generator. The rotor shall in particular be useful for brushless excitation and shall be characterised in a simple and sturdy construction allowing operation at high rotational speeds and for the generation of high direct currents.

The present invention provides a rotor that comprises at least two conductor bars aligned substantially parallel to the axis of the rotor. The bars are connected on their first axial end to at least one collecting ring and on their second axial end individually to two rings, wherein by means of at least one diode the flow of current in each bar is allowed in only one direction such that alternating current induced in the conductor bars due to a static field is converted into a direct current (DC) in the two rings.

A feature of the invention is the fact that it is possible to use a construction for a rotor, which is designed such that in each conductor bar being subject to an induction field the induced current is only allowed in one specific direction but not in the other one. This means that the diodes in each electrical path limit the possible flow of electricity to one direction (only diodes of one specific polarity present, never parallel diodes of opposite polarity), and it additionally means that 50% of the time, one specific bar will not add to the generation of direct current, since the induced current is not permitted due to the blocking polarity of the connected diode. Therefore, preferentially in each electrical path one single diode or a group of diodes is provided, wherein the diodes of the rotor are arranged parallel and wherein, if a group of diodes is provided, all diodes are of parallel polarity irrespective of whether arranged in series or in parallel.

This is in contrast to rotors according to the state-of-the-art, which, generally by using a parallel arrangement of diodes with opposite polarity, make sure that in each conductor bar current is allowed to flow in both directions depending on the polarity of the induction field presently acting upon the bar. However, the proposed solution, which is heavily simplified, allows a very sturdy and reliable construction without losses in efficiency. Typically the proposed construction can be operated at speeds of 6000 to 8000 rotations per minute thereby for example inducing a direct current in the two (DC) rings of more than 2000 Ampere, preferably inducing a direct current of more than 10000 or up to 70000 Ampere, depending on the strength of the static induction field.

A foreseen advantage of the use of only one single diode in one electrical path when comparing it to the situation with two crossed diodes according to the state-of-the-art is a reduction of losses by a factor of 2. The saving is in excess of 12 kV.

In a first preferred embodiment of the present invention, in the presence of at least 4 bars, there are two sets of conductor bars, the first set of which are directly connected on their first axial end to at least one collecting ring and on their second axial end to one of the two rings for the direct current generated by the rotor, and the second set of which are indirectly connected on their first axial end to at least one collecting ring by means of at least one diode and their second axial end to the other of the two rings for the collection of the direct current. Basically it means that in this embodiment, the diodes are normally arranged on the collecting ring side of the rotor.

In another preferred embodiment of the present invention, in which the diodes are normally arranged on the DC ring side of the rotor, there is two sets of conductor bars, the first set of which are connected on their first axial end to at least one collecting ring and on their second axial end are directly connected to one of the two rings for the collection of the direct current, and the second set of which are connected on their first axial end to at least one collecting ring and on their second axial end are indirectly connected by means of at least one diode to the other of the two rings for the collection of the direct current.

According to another preferred embodiment, the rotor is characterised in that the exciter comprises a static field with m poles and in that the rotor comprises n bars evenly distributed along the circumference of the rotor, wherein the bars are connected such that there is at least one directly connected bar subjected to a static induction field of first polarity and such that there is at least one indirectly connected bar subjected to a static induction field of second polarity, and wherein pairs or groups formed by at least one directly connected bar and at least one indirectly connected bar are connected with the same collecting ring. Typically such a construction is used together with a high number of poles of the static field (for example 6, 8, 10 or even more), and a large number n of bars of more than 50, up to 100, typically about 70, all of which are evenly distributed along the circumference of the rotor. This means that 5, 10 or 7 collecting rings are used using this number of bars, respectively, if a static induction field with 10 poles is used.

Correspondingly, the exciter can be designed for a static field with m poles, the rotor comprises n bars evenly distributed along the circumference of the rotor, and the number o of collecting rings in this case equals o=m/n. The system is connected such that for each pole of the static field there is one directly connected bar subjected to a static induction field of first polarity and such that there is one indirectly connected bar subjected to a static induction field of second polarity, wherein for each pole-pair of the stator a pair of bars formed by one directly connected bar and one indirectly connected bar is connected with the same collecting ring, and wherein equivalent pairs of bars of different pole-pairs are connected to the same collecting ring. Optimum efficiency of such a topological network of conductors can be achieved if along the circumference of the rotor every o-th conductor bar of the rotor is directly or indirectly connected to the same collecting ring. The rotor construction therefore has an m-fold symmetry, and a 2 m fold symmetry (alternatingly direct and indirect bars) as relates the connectivity of the bars to a specific collecting ring.

According to still another preferred embodiment, the rotor construction is characterised in that the collecting rings are circumferential, and that preferably also the two (DC) rings are circumferential. Such a construction is particularly sturdy for high rotational speeds.

For achieving an as high as possible efficiency of the induced currents, it is advantageous to locate the bars as close as possible to the radial surface of the rotor. Preferably, the bars are located as close as possible to the air gap between the rotor and the outer static core of the stator.

With respect to the bars used for the rotor, those are preferably made of iron, aluminium or copper, with a substantially circular cross-section of a diameter in a range of 5 to 20 mm, preferably with a diameter in a range of 8 to 15 mm. With respect to the rings, be it the collecting rings on the one side or the direct current rings on the other side of the rotor, those rings are preferably also made of iron, aluminium or copper with a cross-section area in the range of 500 to 3000 mm$^2$, preferably with a cross-section area in the range of 1000 to 2000 mm$^2$.

According to a further preferred embodiment, said rotor is mounted on the same shaft as the generator-rotor which induces the desired alternating current in the main stator of the generator, and the two DC-rings are located at the generator-rotor side of the rotor and the collecting rings are located other side of the rotor. Depending on the chosen connectivity, the diodes will then be either located on the generator-rotor side of the shaft, or on the terminal side of the shaft. Preferentially, the diodes are located at the generator-rotor side of the rotor, since normally then they are located more closely to a fan and are more efficiently cooled.

To allow the use of high current-rated diodes and at the same time to allow high rotational speeds, according to another preferred embodiment of the present invention, the diodes are mounted on the inner surface of a circumferential ring (terminal ring) of the rotor. This circumferential retaining ring may, again depending on the chosen connectivity, either be located on the terminal side of the shaft or on the generator-rotor side of the shaft.

Further preferred embodiments of the rotor according to the invention are defined in the additional depending claims.

The present invention, as already pointed out above, furthermore relates to a brushless exciter for use with a synchronous generator for energising the field winding of its rotor comprising a rotor as outlined above. Typically, such a brushless exciter is characterised in that a multipolar static field is induced by at least one field winding fed with a direct current of in the range of 1 to 100 Ampere, preferably in the range of 5 to 15 Ampere, or that the multipolar static field is induced by at least one permanent magnet. Preferentially, the stator provides a multipolar static field with m poles, wherein m is an integer even number in the range between 4 and 16, preferentially between 6 and 10. Such a brushless exciter is preferentially integrated into the whole generator construction in that the rotor is mounted on the same shaft as the generator-rotor, and in that the two DC-rings are located at the generator-rotor side of the rotor and the collecting rings are located on the other side of the rotor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
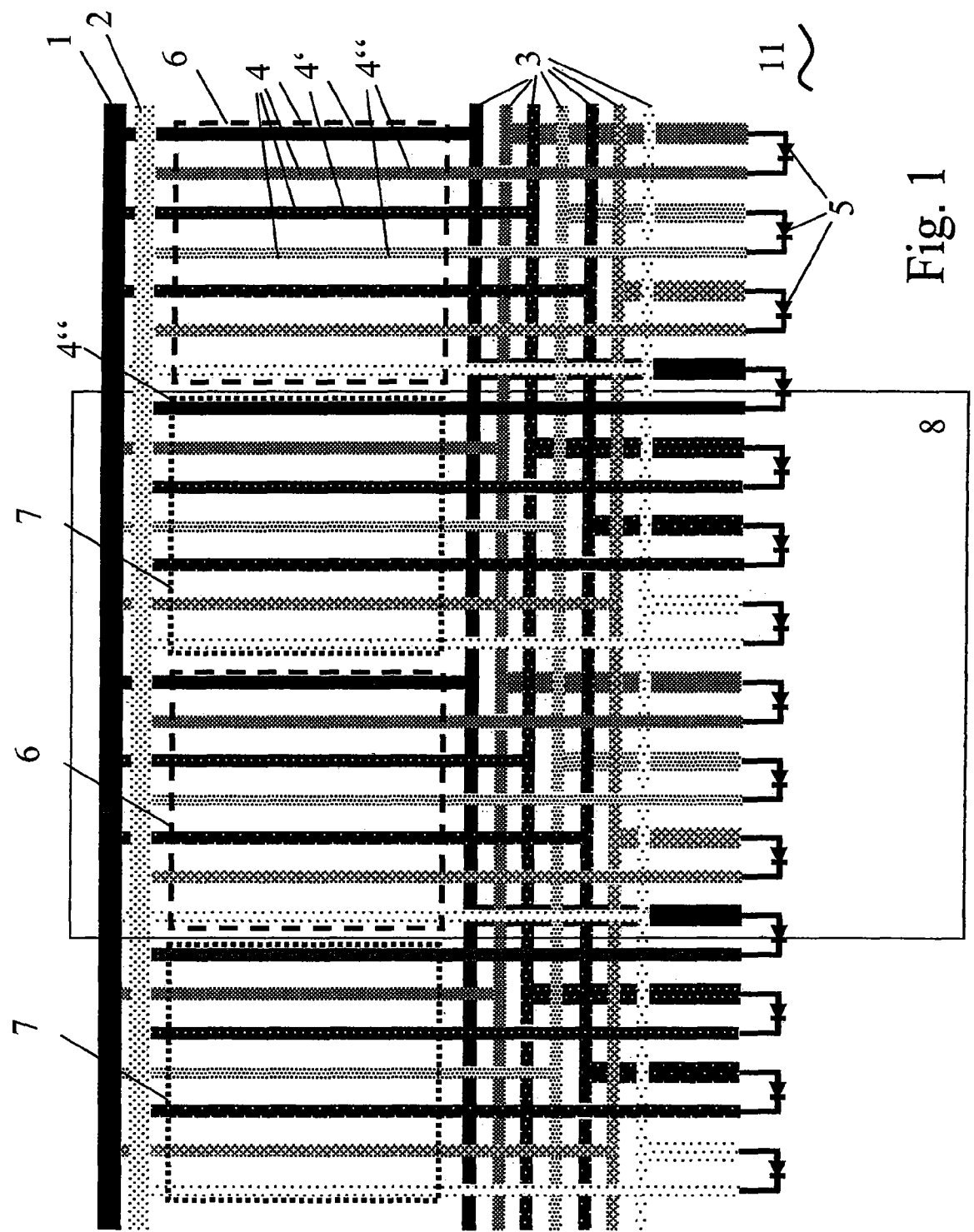
FIG. 1 shows a schematic representation of the connectivity according to a first embodiment of a rotor according to the invention.

FIG. 1 shows a part view of the unwrapped connectivity (circumferential view) of a first embodiment of a rotor according to the invention. The rotor 11 is to be operated together with a static induction field comprising m=10 poles. Correspondingly, the static part (stator 9) provides a static field with alternating induction fields 6 of a 1st polarity and induction fields 7 of a second polarity. The pole pitch, correspondingly repeated five times, is indicated with the reference numeral 8. On the one side (top) there are two direct current rings (DC-rings) 1 and 2, the current of which is to be fed to the rotor 22 of the generator for energising the field windings of the rotor 22. On the other side (bottom) there are o=7 collecting rings 3, each serving as star point rings. Each of these collecting rings 3 is connected by means of two bars 4' and 4" located within one pole pitch 8 with the direct current rings 1, 2.

For example when taking the topmost collecting ring 3 (solid black line), it is, by means of the rightmost bar 4'("direct bar") directly connected to the first direct current ring 1. This direct bar 4' is subject to an induction field 6 of the first polarity of the stator. The second bar 4", when going to the left side, also connected to the topmost collecting ring, is subject to an induction field 7 of the 2nd polarity of the stator. This second or indirect bar 4" is on its top side connected to the second direct current ring 2, and on its bottom side it is connected to the collecting ring 3 via a diode 5. This means that if the polarity of the two fields 6 and 7 is such that the direction of the induced current in the bars 4' and 4" is allowed by the diode 5, it will add to the direct current provided to the direct current rings 1 and 2. If however the polarity of the two fields 6 and 7 is reversed due to rotation of the rotor into the next pole pitch 8, the current induced in those two bars will be blocked by the diode 5.

From this example one can see that the connectivity as displayed in FIG. 1 if rotated in the multipolar static field will lead to a situation, where a specific collecting ring 3 will, in 50% of the time, namely if the polarity of the fields 6 and 7 and correspondingly the direction of the induced current in the bars matches the direction of the diodes 5, add to the direct current induced in the rings 1 and 2. In the other 50% of the time, namely if the polarity of the fields 6 and 7 and correspondingly the direction of the induced current in the bars is opposite to the direction of the diodes 5, it will not be active and not contribute to the direct current in the rings 1 and 2. In other words, each bar will only contribute to the direct current made available on the other rings 1 and 2 during 50% of the time. Due to the fact however, that there are several collecting rings, each with correspondingly rotationally and alternatingly shifted bars, there are always collecting rings and bars contributing to the direct current induced in the rings 1 and 2.

Figure 2:
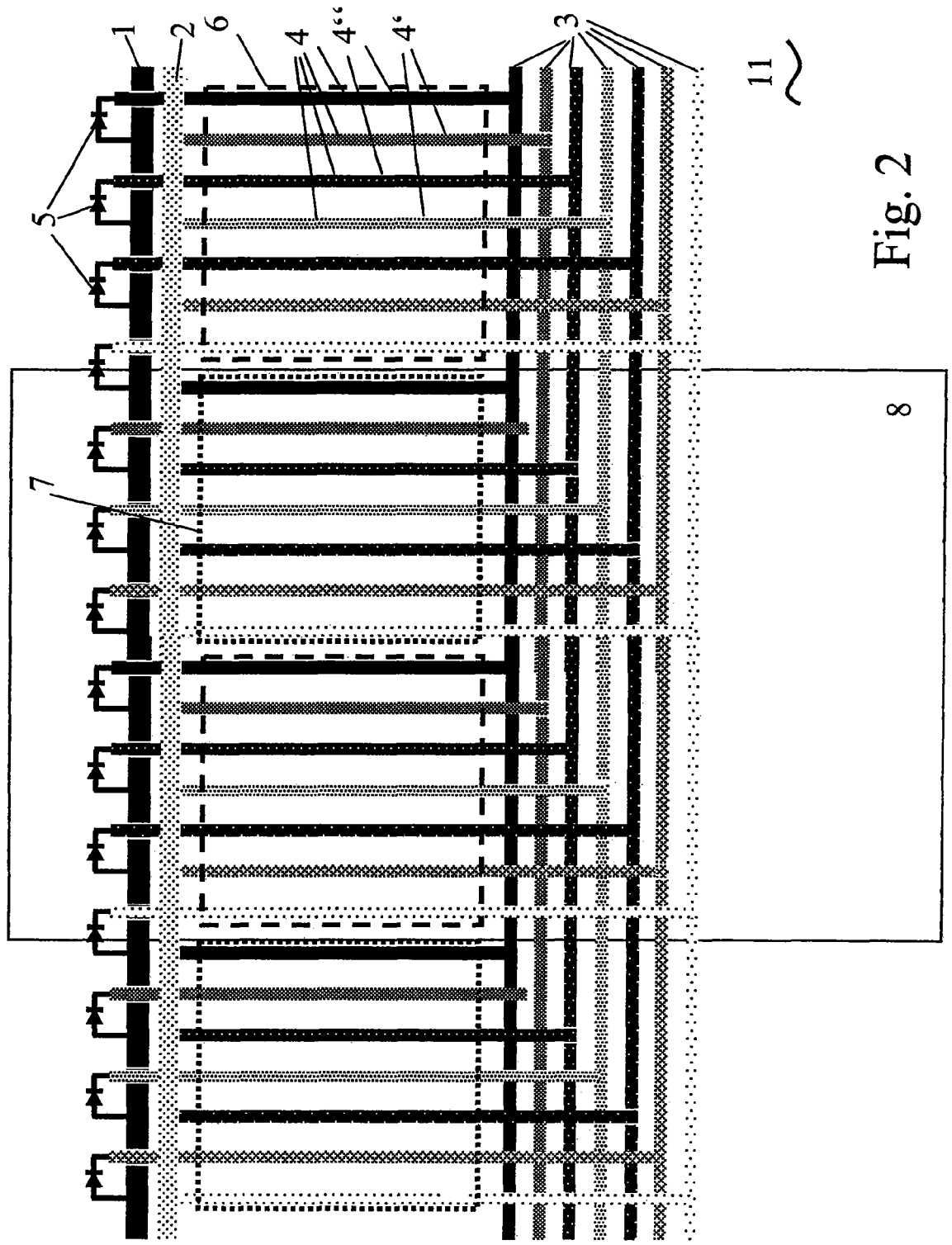
FIG. 2 shows a schematic representation of the connectivity according to a second embodiment of a rotor according to the invention.

While in FIG. 1 the diodes are located on the collecting ring-side of the rotor, FIG. 2 shows another embodiment, in which the diodes are located on the direct current ring-side. Since usually the direct current rings 1 and 2 are located on the side of the shaft which is adjacent to the rotor 22 of the generator, and since cooling conditions in these regions may be better and therefore more appropriate for proper functioning of the diodes 5, the design as given in FIG. 2, while being basically equivalent to the connectivity design of FIG. 1, may be advantageous in certain situations. A connectivity according to FIG. 2 shows the following advantages:

- Possibility of improving the diode ring cooling and ventilation
- Ease the use of a second diode wafer
- Reduce the overhung length in the diode area
- Increase the distance between fans and exciter field windings (stator windings 10)
- Improve the terminal ring cooling
- Simplify the housing and the mandrel 18
- Avoid protruding parts (diode ring diameter is larger than the bore).

Figure 3:
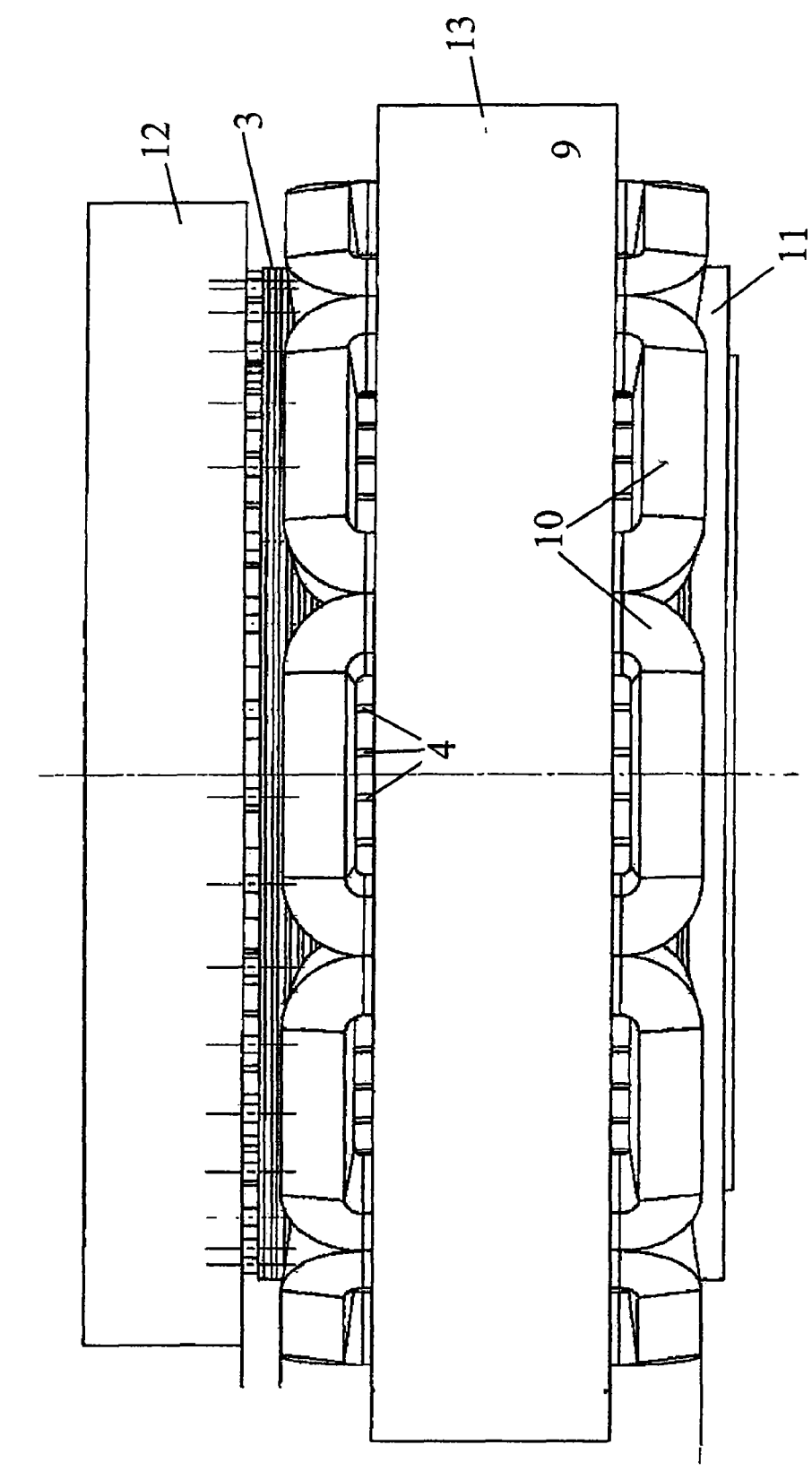
FIG. 3a) shows a top view onto a brushless exciter including the static part according to the invention; b) shows a top view onto a rotor according to the invention.
Figure 3:
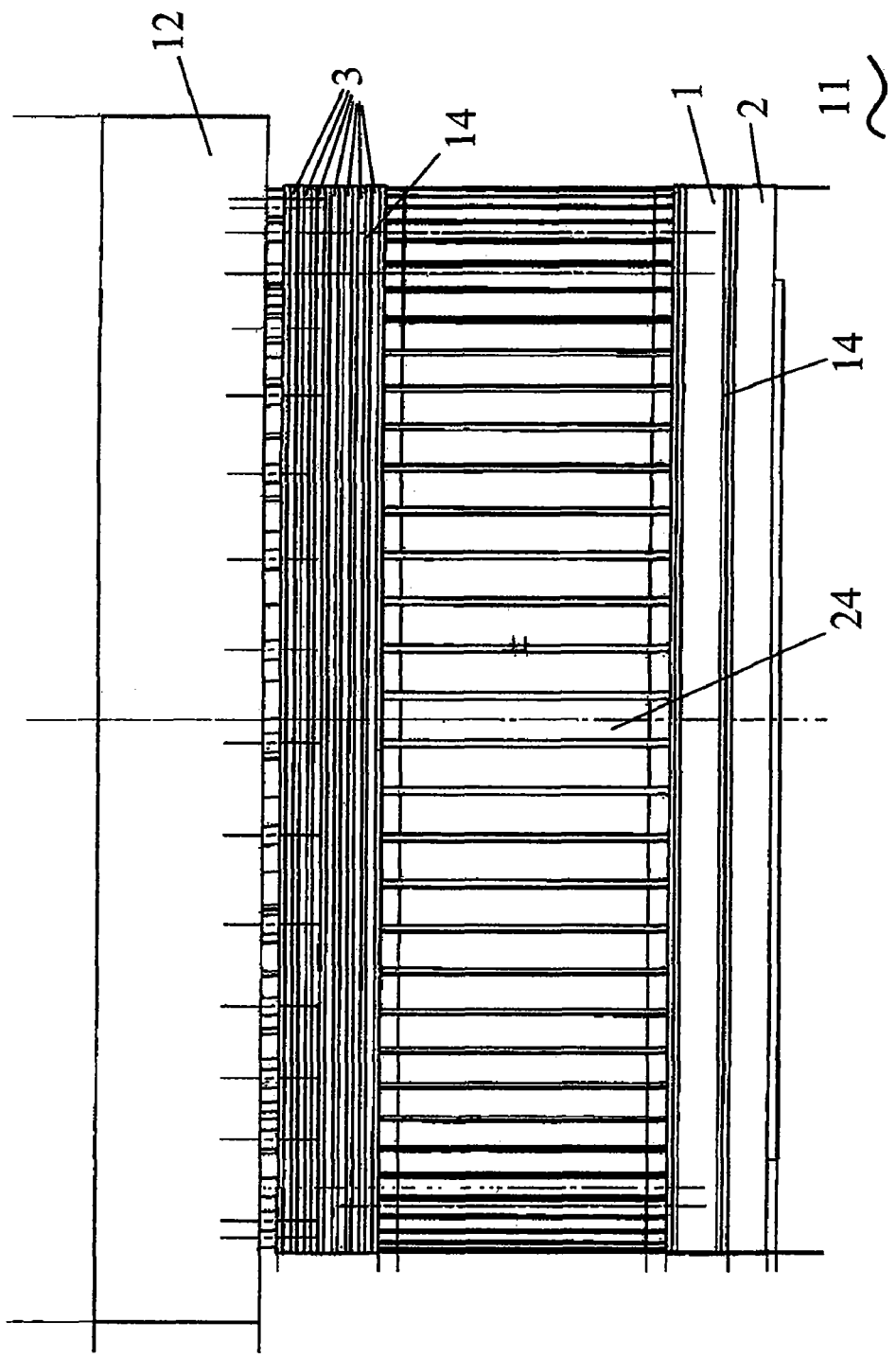

To show the design of such a rotor in more detail, FIG. 3a) gives a top view onto a brushless exciter. It therefore also comprises the static parts, i.e. the stator 9 which comprises a circumferential ring 13, on the inner surface of which stator windings 10 are provided for the generation of the induction fields 6 and/or 7. In the present embodiment, a stator 9 with m=10 poles is shown, therefore there is 10 such windings 10. The rotor 11 is coaxially mounted in this outer static magnetic core (stator 9), wherein in between there is an air gap.

The rotor 11 of the brushless exciter is also partially visible. In particular, the retaining ring 12 (terminal ring) of the rotor 11 can be seen, the details of which will be explained further below. Additionally, the collecting rings 3 can be seen as well as the conductor bars 4 of the rotor 11 as partially visible from the outer side (for more details see below).

FIG. 3b) gives the same view as FIG. 3a) but with the static parts removed. The rotor 11 comprises, on one side, the two direct current rings 1 and 2, which are separated from each other by means of an isolation layer 14. The two direct current rings 1 and 2 are given as circumferential rings. On the other axial side of the rotor, there are the 7 collecting rings 3, which are also circumferential rings that are separated by isolation layers 14. The top side of the rotor 11 is formed by the circumferential retaining ring 12 of the exciter rotor. Also visible are the laminations 24 of the rotor taking up the bars 4.

As can be seen from FIG. 3b), but also from the following figures, basically the rotating part, i.e. the rotor 11, looks very much like the one of an induction machine with a squirrel cage rotor. On a one side all the conductors, which are given by bars 4, are welded or electrically connected to the collecting rings 3 that collect the current and dispatch it to (return) bars 4. On the other side, each bar 4 is electrically connected individually to two rings 1 and 2. These two rings 1 and 2 are the DC terminals. All the bars 4 are identical and are evenly distributed around the circumference of the rotor 11. Rectification of the alternating current induced in the bars 4 when the rotor 11 is rotating in the static magnetic field (induction field 6, 7) is provided by the diodes wherein, as outlined above, only 50% of the bars are effectively contributing to the currents generated in the two rings 1 and 2 due to the fact that current is only allowed to flow in one direction by the diodes 5. The direct current as available from the two rings 1 and 2 can subsequently be used for energising the rotor 22 of the generator.

The bars 4 as well as the rings 1, 2 and 3 are made of iron, copper or aluminium. For a diameter of the rotor 11 of approx. 500 to 600 mm, 70 bars are distributed along the circumference of the rotor 11, each of the bars 4 having a substantially circular cross-section with a diameter of 8 to 15 mm. The bars in the present case have a diameter of 8 mm, are made of copper and have an isolating layer of 1 mm. The isolation should be kept to be as thin as possible to allow sufficient dissipation of the heat generated in the bars. Alternatively, a bar of aluminium with a diameter of 10 mm can be used. The use of aluminium is advantageous because of the much lower weight than in the case of copper. In the case of the rings 1, 2, but also for the collecting rings 3, aluminium is preferred due to the low weight in spite of the lower conductivity.

Such a rotor is capable of rotating at speeds of 4000 to 8000 rotations per minute, and of producing direct currents in a range of 5000 to 20000 or up to 80000 Ampere. The achievable rotational speeds are therefore at least twice as high as conventional speeds, and the achievable currents are even in the range of 20 to 30 or more times with respect to the state-of-the-art. The rings 1,2,3 are circumferential to withstand the centrifugal forces at these rotations. The bars 4 may be moulded into corresponding slots of the laminations 24 of the rotor 11, which slots preferably have shapes which allow a tight fixing of the bars with respect to centrifugal loads (e.g. dove tails). Another possibility, and that's the one displayed here, is to provide axial holes in the laminations 24 of the rotor 11 and to insert bars 4 into these holes from the axial side.

Figure 4:
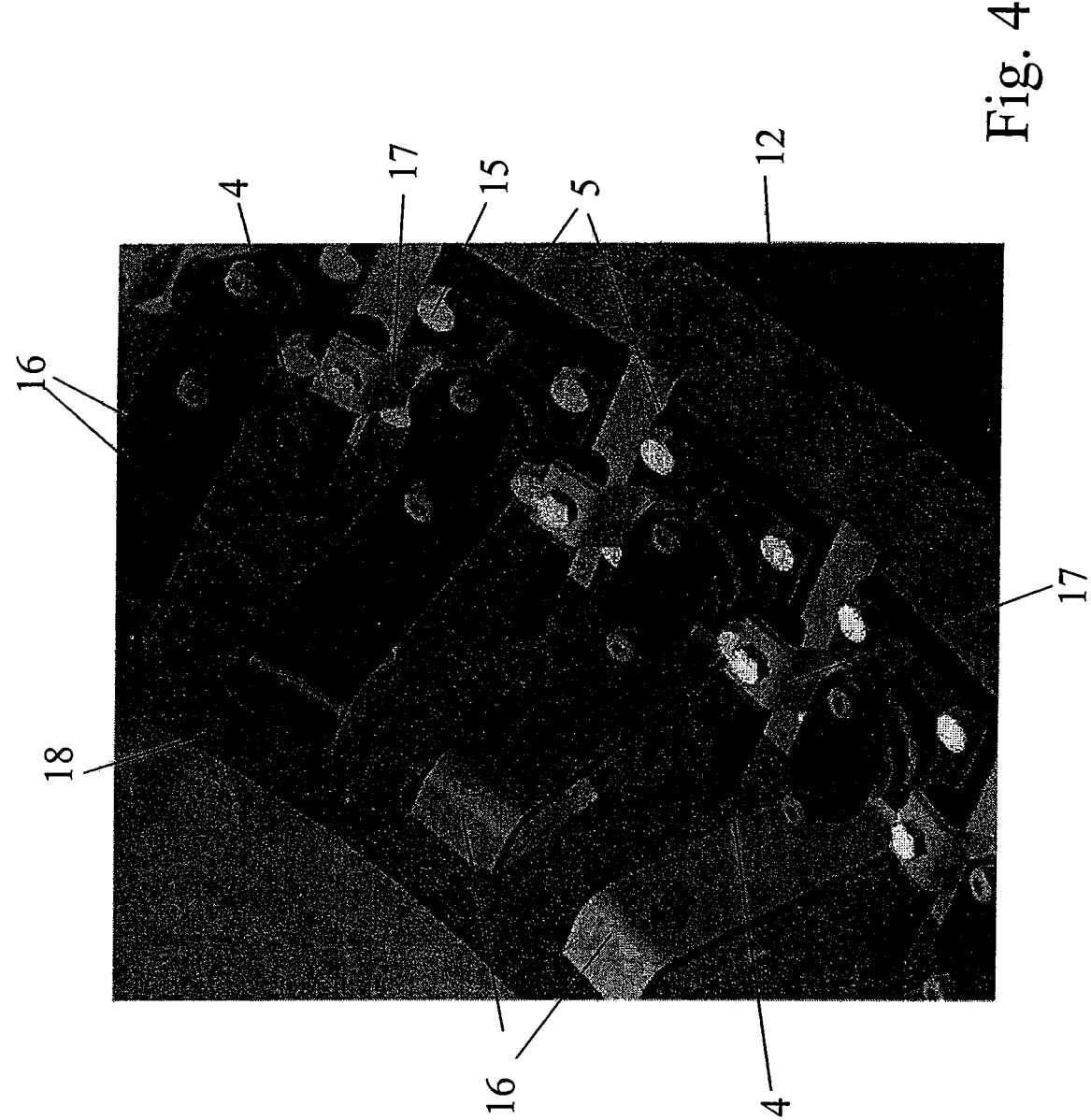
FIG. 4 shows a perspective detailed view of the region of the rotor, where the diodes are located.

FIG. 4 gives a detailed view of a section of the side of the rotor 11 where the collecting rings 3 as well as the diodes 5 are located. It is a view onto the inner surface of the retaining ring 12. On the inner surface of the retaining ring 12 the diodes 5 are evenly distributed and fixed to the retaining ring 12 by means of screws 15. This provides a very sturdy construction, which is particularly reliable when using high rotational speeds.

In the present case, high-power diodes are used as for example the Dynex type PA 01597-477 based on the wafer of Dynex diode reference DS 502-1200. One of the main characteristics of such a set up is that a repetitive reverse voltage of 1200 V can be withstood. For the set up as given, i.e. for the 10 kA, 10 pole, 70 phase construction, a diode mean current of 300 A, a diode root mean square current of 600 A and a bar root mean square current of 600 A is expected.

FIG. 4 shows a connectivity according to FIG. 1. Correspondingly, every second bar 4 (in this particular case it is the indirect bars 4") is directly connected to a diode 5. To this end, connectors 17 are fixed to the ends of the bars 4 and to the diode 5. The other bars which are not directly connected to the diodes (correspondingly these are the direct bars 4'), are connected to the collecting rings (not visible in FIG. 4), and the connection between the collecting rings 3 and the diodes 5 is given by a set of connectors 16 which are designed to bridge collecting rings 3 which are located more terminally than the collecting ring 3 to be connected to the diode 5.

Figure 5:
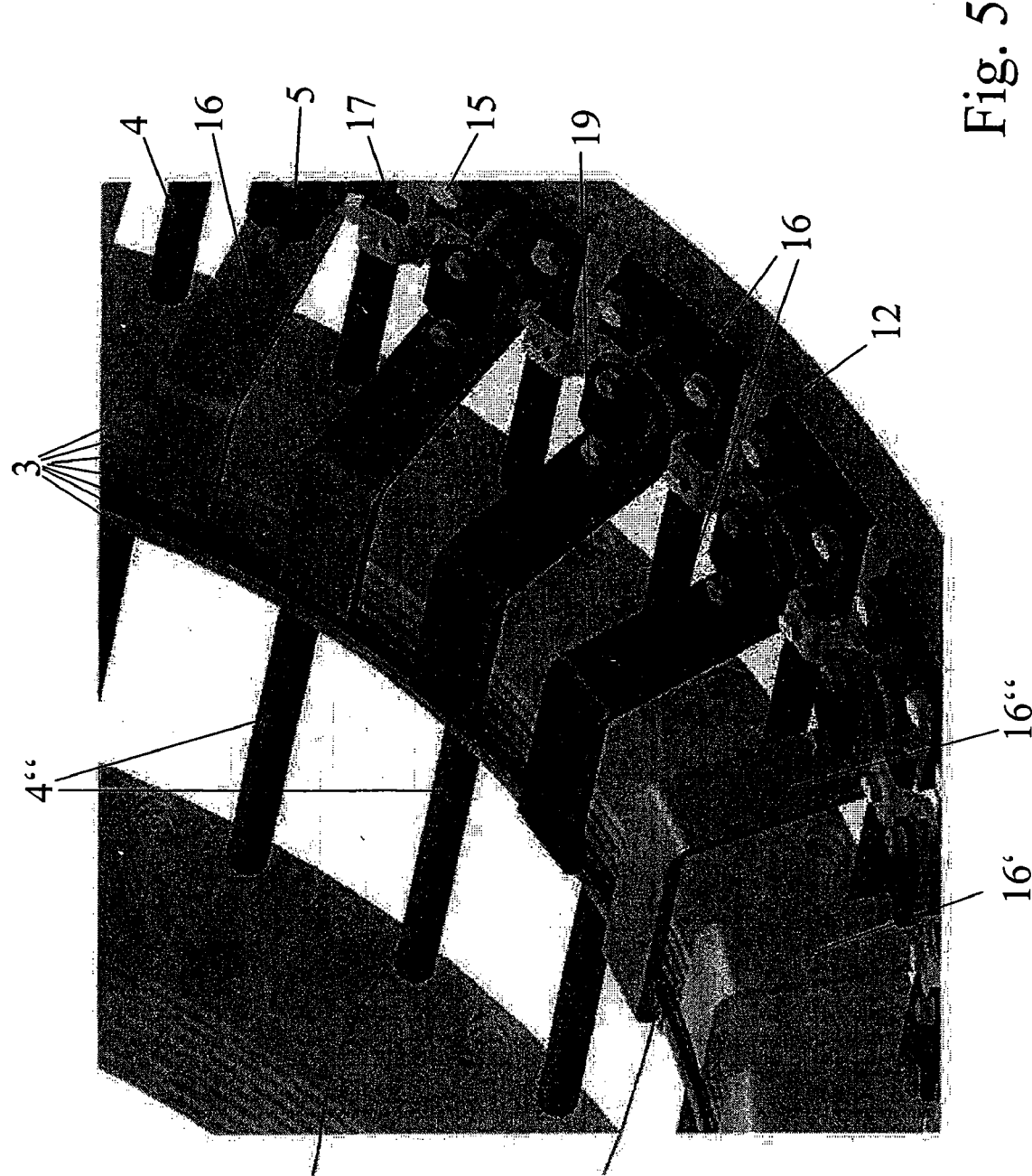
FIG. 5 shows a perspective detailed view according to FIG. 4, in which half of the bars as well as mandrel and lamination components are removed.

FIG. 5 shows a view equivalent to the one displayed in FIG. 4 wherein parts of the housing and shielding components (mandrel) of the rotor as well as the lamination 24 and the retaining ring are removed. Also removed for better visibility are those direct bars 4', which are directly connected to the collecting rings 3. As one can see in FIG. 5, the connectors 16 are in a systematic order connecting the collecting rings 3 to the diodes 5. So the bottom most connector 16' connects the collecting ring 3 which is located most closely to the diodes, which correspondingly is the terminal collecting ring 3. The subsequent connector 16" connects the innermost collecting ring 3, and the following connectors are connecting the adjacent collecting rings 3 in a sequence until reaching the outermost collecting ring again.

As can also be seen in FIG. 5, holes 19 are provided in the collecting rings 3 for the direct bars 4'. Depending on the collecting ring 3 to which a specific direct bar 4' is to be connected, such connectivity will be established within this hole 19.

Figure 6:
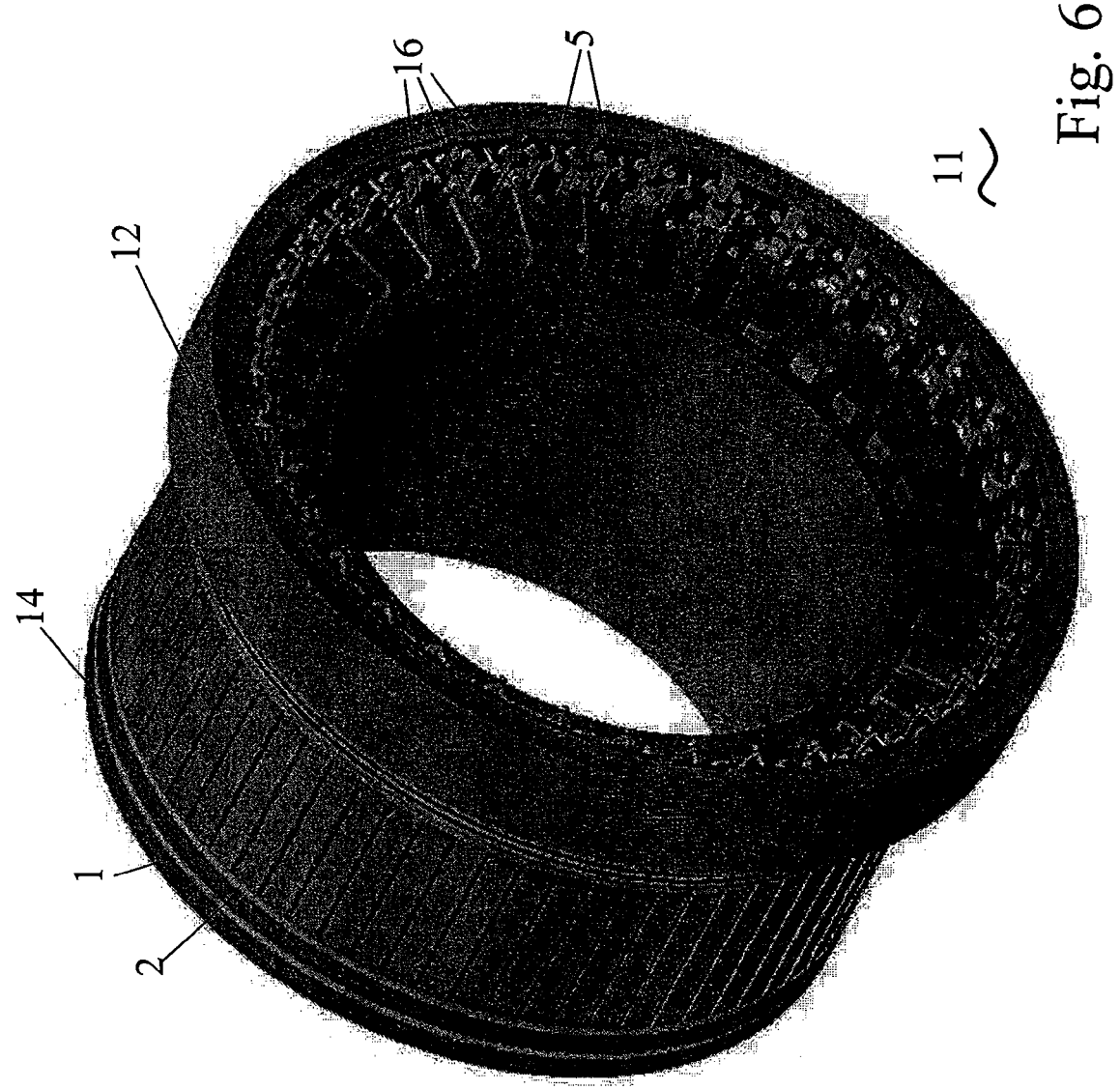
FIG. 6 shows a perspective view of a rotor according to the invention.

FIG. 6 shows a full perspective view of a rotor according to the invention. It can be seen that the bars 4 are almost completely hidden within the lamination 24 of the rotor, while the diodes 5 and the connectors 16 and 17 are freely exposed so that efficient cooling of those parts is possible.

Figure 7:
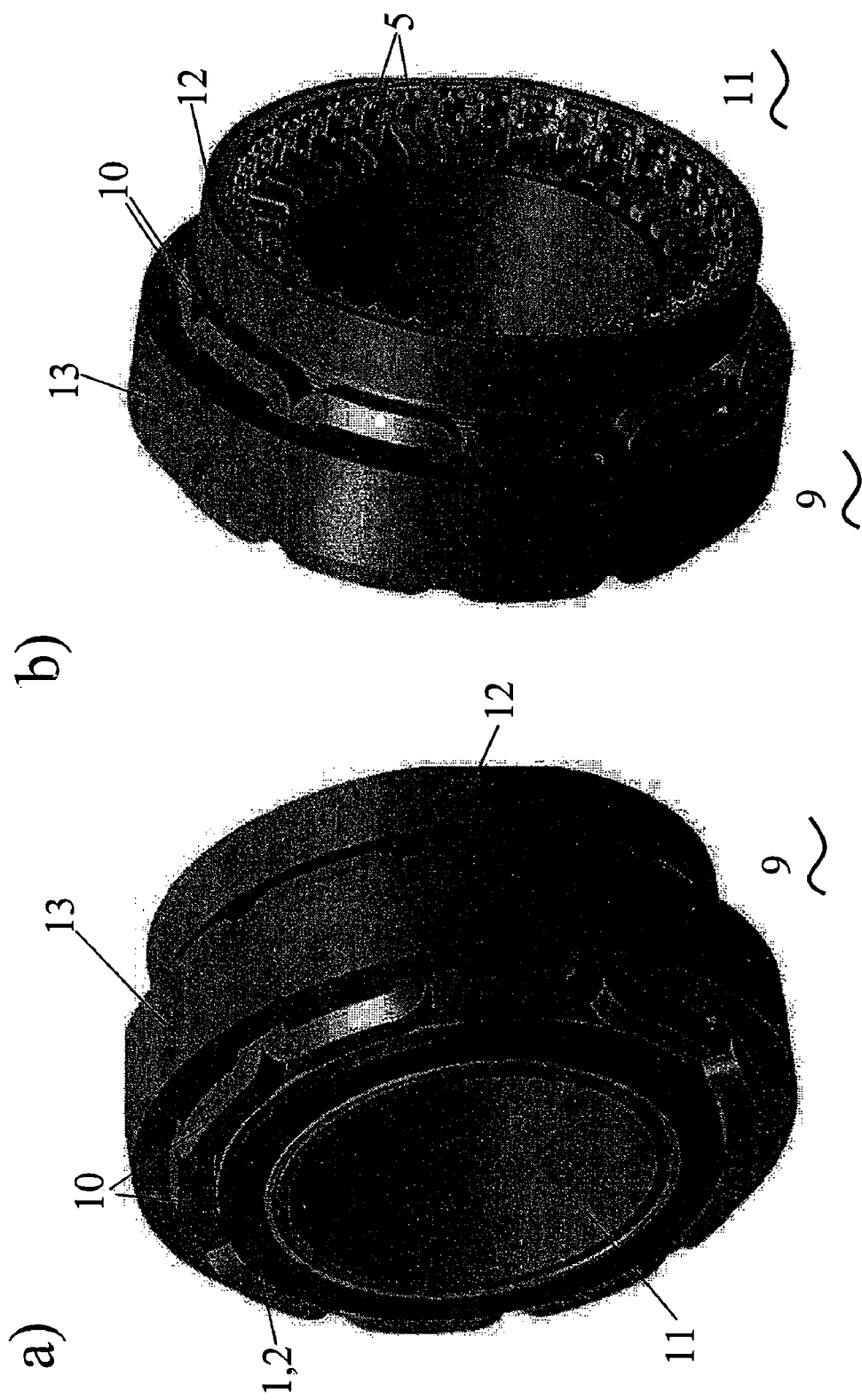
FIG. 7 shows two perspective views of a brushless exciter according to the invention, wherein a) displays a view from the side where the DC-rings are located, and b) displays a view from the side where the diodes are located.

FIG. 7 also shows two perspective views this time including the static parts, i.e. not only the rotor 11 but also the stator 9. FIG. 7a) gives the view from the side on which the DC-rings 1 and 2 are located, while FIG. 7b) gives the view of the side where the collecting rings 3 and the diodes 5 are located.

Also FIGS. 6 and 7 display a connectivity according to FIG. 1. It has to be pointed out, that the connectivity according to FIG. 2 can easily be obtained in analogy, namely by locating the set of diodes and also the retaining ring 12 on the side, where the DC-rings 1 and 2 are located.

Figure 8:
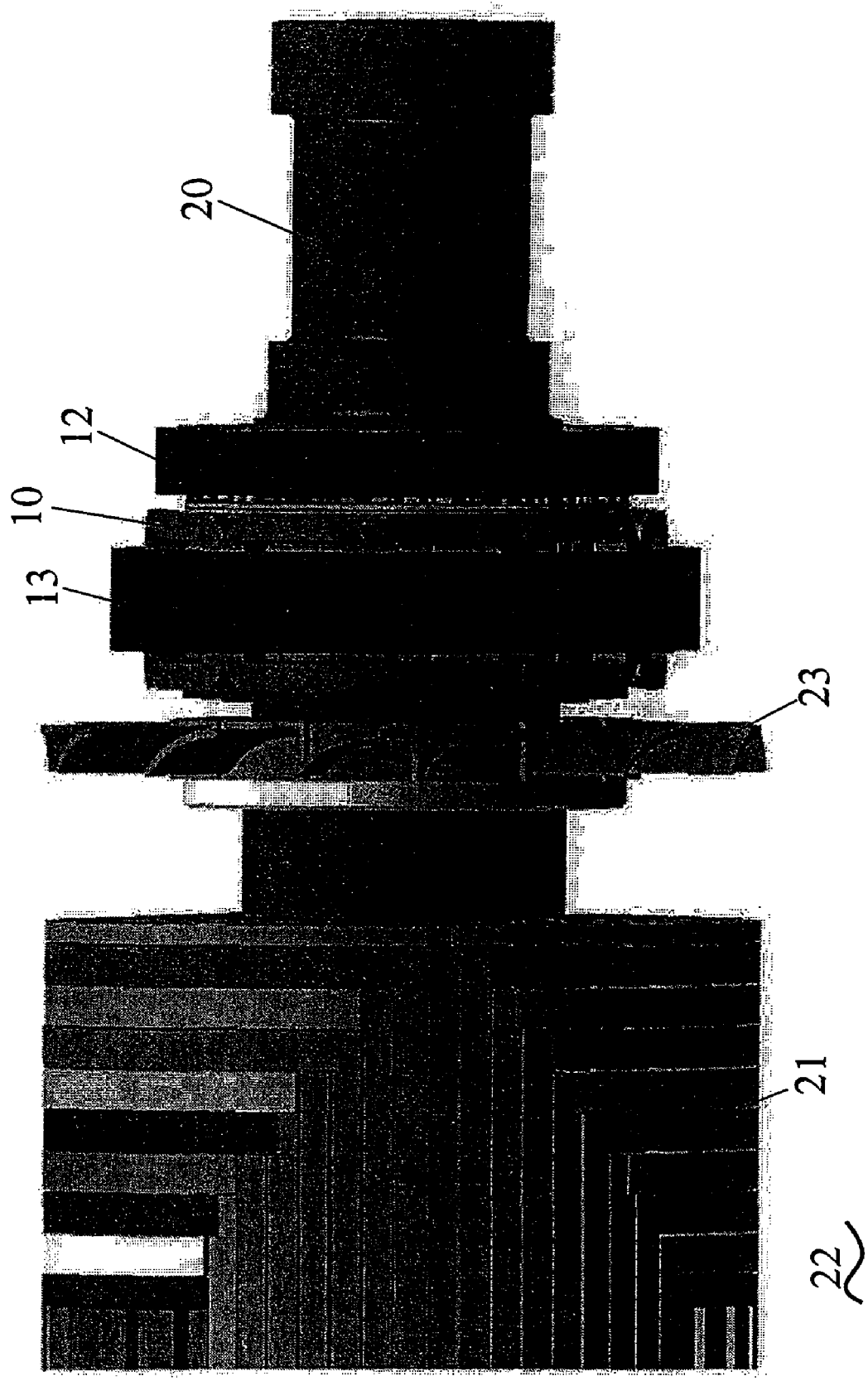
FIG. 8 shows a side view onto the shaft portion of the generator, where the brushless exciter is located, including parts of the main rotor of the generator.

To give a more general view of how such a brushless exciter is to be positioned within the whole rotor system of the generator, FIG. 8 displays the rotor 22 of the generator with its windings 21. The brushless exciter including the static parts and the rotating parts is mounted on the same shaft 20 as the rotor 22 of the generator. Between the windings 21 of the rotor 22 of the generator and the brushless exciter there is provided a fan 23 for cooling the whole system. It has to be pointed out that due to the fact that the fan 23 is generally located between the brushless exciter and the generator, and due to the fact that normally the DC-rings 1 and 2 have to be located on the generator-rotor side of the shaft, it may, in view of cooling of the diodes, be advantageous to use the connectivity according to FIG. 2 where the diodes are correspondingly located close to the fan 23.

The rotor 11 of the exciter has a lamination 24 (iron) inner diameter of approximately 450 mm, and a lamination outer diameter of approximately 550 mm. The axial length of the yoke is approximately 120 mm, the number of phases is 70, the slot opening is 4 mm, and the mean radius of the bar centres is approximately 280 mm. The air gap is 4 mm. The static part has 10 poles and the conductors are given by round wires with approximately 250 turns per coil. All the coils 10 are connected in series. The DC rated current is 15 A.

A brushless exciter as given above has the following load characteristics: resistance <1.4 mΩ; rated current 10.2 kA, rated voltage <14.3 V; rated power <150 kW; inductance 8.3 mH; time constant >5.9 s. Generally one can say that one can expect the rotor currents to increase up to 80 kA.

FIGS. 3-8 display an architecture which realises a topology according to FIG. 1. Accordingly in the setup according to FIGS. 3-8 the diodes 5 and the collecting rings 3 are located at the same terminal axial side of the rotor 11. However, location of both elements, namely of the diodes 5 and the collecting rings 3 at one side of the rotor 11 leads to very restricted spatial conditions at this terminal end of the rotor.

Therefore, a preferred variant of the present invention uses the topology as given in FIG. 2, in which the diodes 5 and the collecting rings 3 are located at the opposing sides of the rotor, leading to more convenient possibilities of placing the elements at the different ends.

Figure 9:
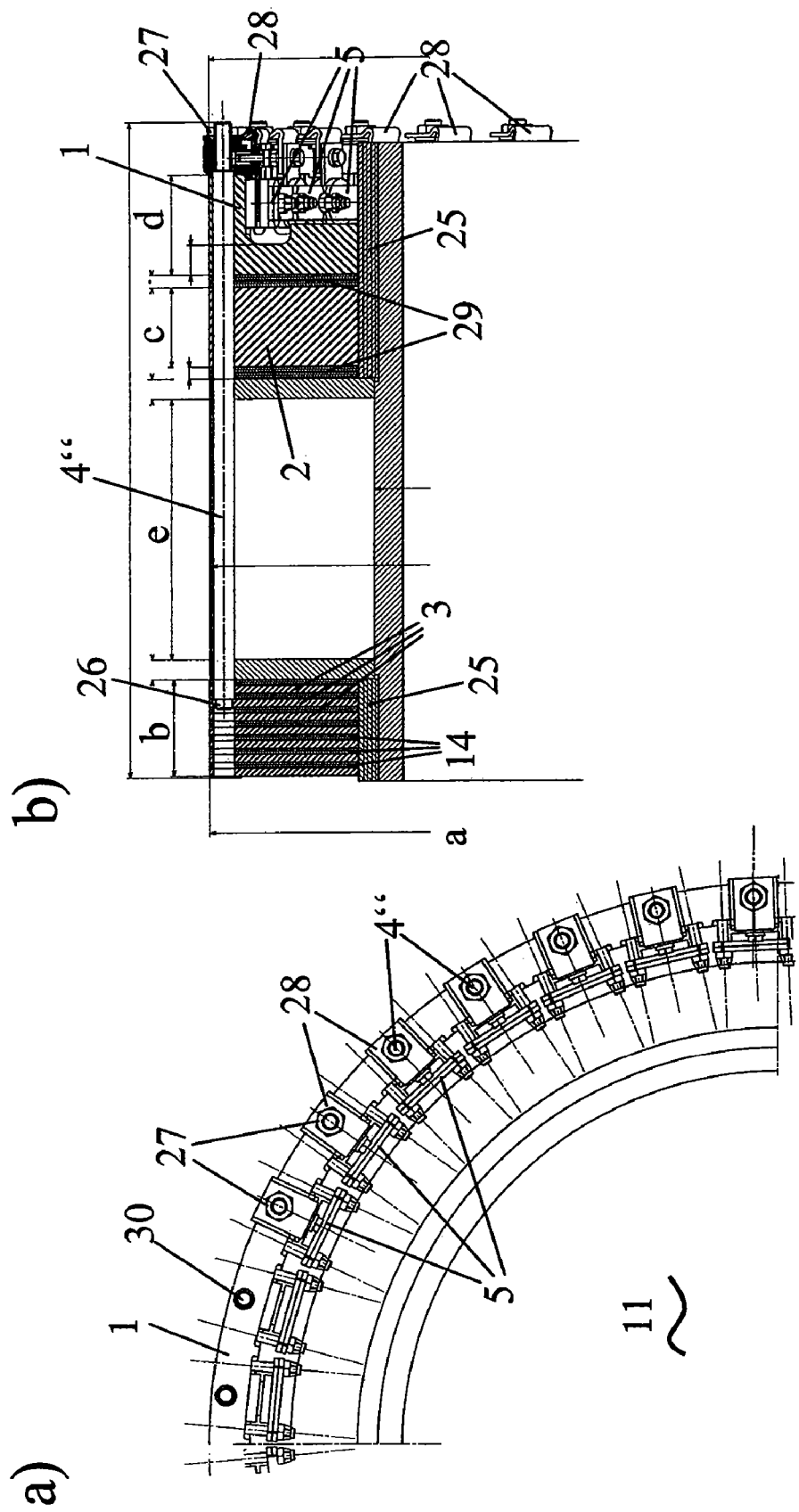
FIG. 9a) shows an axial view onto the end of a rotor in which the diodes and the collecting rings are located at opposing ends of the rotor according to another embodiment; b) shows an axial cut of such a rotor; c) indicates the details of the connection of the indirect bars in a cut view; d) indicates the details around the diodes in a view according to a); e) gives a perspective view on the first DC-ring.
Figure 9:
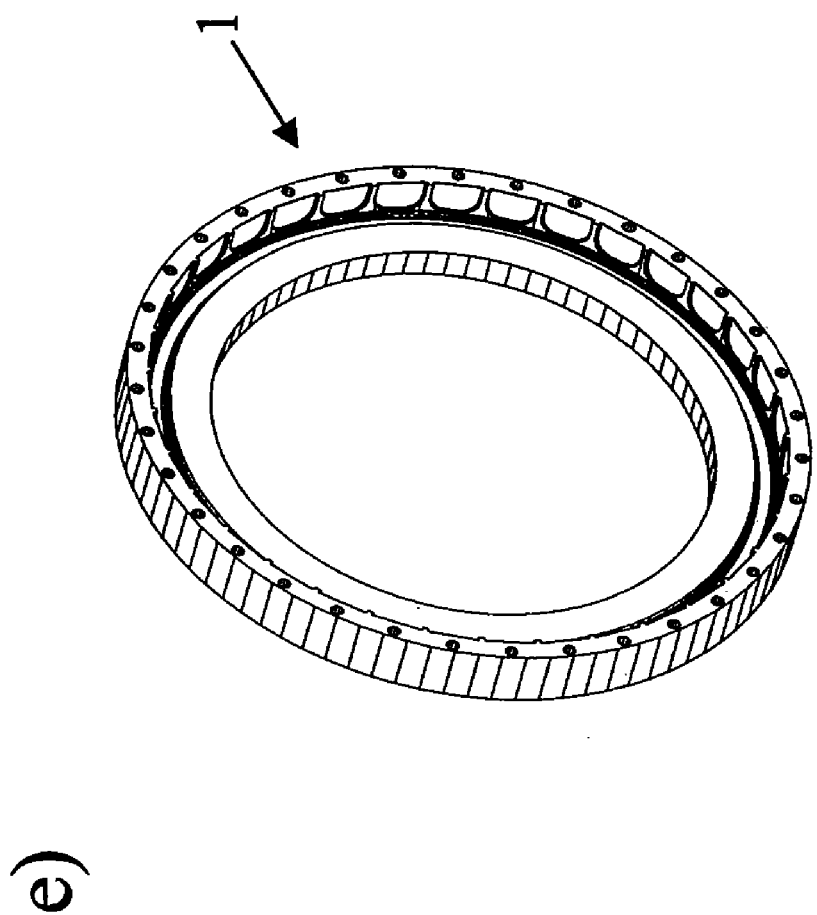

A corresponding example embodying a topology according to FIG. 2 is given in FIG. 9. FIG. 9a) gives an axial view onto the end of a rotor 11 on which the diodes 5 are located. FIG. 9b) on the other hand gives an axial cut of such a rotor wherein the cut is going through one of the indirect bars 4". The FIG. 9c) indicates the details of the connection of the indirect bars 4" to the diode 5 in a cut view, FIG. 9d) indicates the details around the diodes in a view according to FIG. 9a). Finally FIG. 9e) gives a perspective view on the first DC-ring which at the same time in this embodiment is the ring supporting the diodes 5.

In particular it is visible in FIG. 9 that in this case the collecting rings 3 are located on one end towards the left and the diodes 5 are located on the other end towards the right. The individual collecting rings 3 are separated by isolating layers 14 or discs which are located between the collecting rings 3.

The collecting rings 3 are provided with bores which allow the bars 4 to penetrate the collecting rings 3 and to connect the bars where needed.

One possibility of how to connect a bar to the desired collecting ring 3 is detailed in FIG. 9b). In this case, the indirect bar 4" shall be connected to the second collecting ring 3 counted from the right. To this end, the collecting ring 3 is provided with a slightly narrower bore at this radial position. On the other hand, the isolating layer of the indirect bar 4" is removed at the portion 26, where contact shall be established to the corresponding collecting ring 3, and the length of the indirect bar 4" is adapted to match the position of the corresponding collecting ring 3. Accordingly, the connection can easily be established in locating collecting rings with correspondingly adapted widths of the bores and by inserting bars 4 of the appropriate length.

On the right side of FIG. 9b) and in more detail in FIG. 9c) the situation on the side where the diodes 5 are located is given. It can be seen that the two DC-rings 1 and 2 are located adjacent to each other, separated by an isolating layer 29 with respect to each other and with respect to the central axis there is an isolating layer 25. The indirect bars 4" penetrate both DC-rings 1, 2 and on their end to the very right in FIG. 9b) the bars 4" are connected to the diodes 5.

This is realised in that the indirect bars 4" are provided with a terminal threading, and there is provided a corresponding nut 27, by means of which a bent metal conductor 28 is tightly connected with the indirect bar 4" on the one side and with the diode 5 on the other side. The first DC-ring 1 on the one hand electrically acts for collecting the DC-part, but on the other hand also acts as a support for the diodes 5, which simplifies the whole setup.

It has to be pointed out that in FIG. 9 only the indirect bars 4" are visible and indicated. As can be seen from the topology according to FIG. 2, the direct bars 4' are connected to the second DC-ring 2. This means that at angular positions between the angular positions of the indirect bars 4" there is always a direct bar 4', which however are not visible in FIG. 9 since these direct bars 4' do not penetrate the first DC-ring 1.

In the setup according to FIG. 9 correspondingly the first DC-ring 1 only comprises bores 30 at the radial positions where the indirect bars 4" are to be located (see also FIG. 9e). The direct bars 4' end before the first DC-ring 1 and are directly connected to the second DC-ring 2.

Correspondingly, the second DC-rings 2 are provided with as many penetrating bores as there are indirect bars 4", but in addition to that are provided with an equal number of additional penetrating bores or blind holes for the direct bars 4' at radial positions between the penetrating bores for the indirect bars 4".

Typical dimensions of the setup according to FIG. 9 are as follows: a=560 mm; b=50 mm; c=40 mm; d=50 mm; e=130 mm. Depending however on the necessary power and/or rotations to withstand, these dimensions may be scaled correspondingly.

What is claimed is:

1. A rotor for an exciter having a static field and used to energize a field winding of a generator-rotor of a generator, the rotor comprising:

at least two first conductor bars aligned substantially parallel to an axis of the rotor and each having two axial ends;

a first ring;

a second ring;

a plurality of collecting rings, wherein the at least two first conductor bars are connected on their first axial ends to one of the collecting rings and on their second axial ends to at least one of the first and second rings;

at least one first diode disposed in each first conductor bar, wherein a flow of current in each first conductor bar is allowed only in one direction by the diode such that an alternating current induced in the first conductor bars due to the static field is converted into a direct current in the first and second rings.

2. The rotor as recited in claim 1, wherein the at least two first conductor bars are directly connected on their first axial ends to one of the collecting rings and on their second axial ends to one of the first and second rings, and further comprising at least two second conductor bars aligned substantially parallel to the axis of the rotor and each having two axial ends, and a second diode disposed in each second conductor bar, wherein the at least two second conductor bars are indirectly connected on their first axial end to one of the collecting rings via the second diode and on their second axial ends to the other of first and second rings.

3. The rotor as recited in claim 1, wherein the at least two first conductor bars are connected on their first axial ends to at least one of the collecting rings and on their second axial ends are directly connected to one of the first and second rings, and further comprising at least two second conductor bars aligned substantially parallel to the axis of the rotor and each having two axial ends, and a second diode disposed in each second conductor bar, wherein the at least two second conductor bars are connected on their first axial end to at least one of the collecting rings and on their second axial ends are indirectly connected via the second diode to the other of first and second rings.

4. The rotor as recited in claim 1, wherein the static field includes m poles and the at least two conductor bars includes n conductor bars evenly distributed along a circumference of the rotor, wherein the conductor bars include at least one group including at least one directly connected bar subjected to a first static induction field of a first polarity and at least one indirectly connected bar subjected to a second static induction field of a second polarity, and wherein the at least one group is connected to the same one of the plurality of collecting rings.

5. The rotor as recited in claim 1, wherein the static field includes m poles, the at least two conductor bars includes n conductor bars evenly distributed along a circumference of the rotor, and in that the plurality of collecting rings includes o conductor rings, wherein o=m/n and wherein the o connecting rings are connected such that for each pole of the static field there is a conductor bar pair including one directly connected conductor bar subjected to a static induction field of a first polarity and one indirectly connected bar subjected to a static induction field of a second polarity, and wherein for each pole-pair of a stator, a conductor bar pair is connected with a same one of the plurality of collecting rings, and wherein equivalent pairs of bars of different pole-pairs are connected to the same collecting ring.

6. The rotor as recited in claim 5, wherein along the circumference of the rotor every $o^{th}$ bar of the rotor is directly or indirectly connected to the same collecting ring.

7. The rotor as recited in claim 1, wherein the collecting rings are arranged circumferentially.

8. The rotor as recited in claim 1, wherein the first and second rings are arranged circumferentially.

9. The rotor as recited in claim 1, wherein the first diodes of the at least two first conductor bars are arranged in parallel to one another in each electrical path.

10. The rotor as recited in claim 1, wherein the at least one first diode includes at least two first diodes disposed in each of the first conductor bars, and wherein the at least two first diodes are of parallel polarity.

11. The rotor as recited in claim 1, wherein the at least two first conductor bars are arranged in a region of a radial surface of the rotor.

12. The rotor as recited in claim 11, wherein the at least two first conductor bars are arranged as close as possible to an air gap between the rotor and an outer static core of a stator.

13. The rotor as recited in claim 11, wherein the at least two conductor bars includes at least 4 conductor bars evenly distributed along the circumference of the rotor.

14. The rotor as recited in claim 13, wherein the at least four conductor bars includes at least 70 conductor bars.

15. The rotor as recited in claim 1, wherein the at least two first conductor bars are made of one of aluminium and copper, have a substantially circular cross-section, and a diameter in a range of 5 to 20 mm.

16. The rotor as recited in claim 1, wherein each of the first ring, the second ring, and the collecting rings are made of one of iron, aluminium and copper and have a cross-section area in a range of 500 to 3000 mm$^2$.

17. The rotor as recited in claim 1, wherein the rotor is operable at a speed of 6000 to 8000 rotations per minute so as to inducing a direct current in the first and second rings of more than 2000 Ampere.

18. The rotor as recited in claim 1, wherein the static field is provided by a field winding on an outer static core of a stator, giving rise to a multipolar static magnetic field.

19. The rotor as recited in claim 1, wherein the rotor is mounted on a same shaft as the generator-rotor, the first and second rings are disposed at a first side of the rotor facing the generator-rotor, and wherein the plurality of collecting rings are disposed at a second side of the rotor opposite the first side.

20. The rotor as recited in claim 18, wherein the first diodes are disposed at a first side of the rotor facing the generator-rotor.

21. The rotor as recited in claim 1, further comprising a retaining ring and wherein the first diodes are disposed on an inner surface of the retaining ring.

22. The rotor as recited in claim 1, wherein at least one of the first and second rings provides a supporting ring for the first diodes.

23. The rotor as recited in claim 22, wherein the at least one of the first and second rings includes at least one cylindrical portion, and wherein the first diodes are located on a radially inward side of the cylindrical portion.

24. The rotor as recited in claim 22, wherein the at least one of the first and second rings has an essentially L-shaped profile having a first and a second leg, wherein the first leg is disposed essentially radially and the second leg is disposed essentially axially, and wherein the second leg supports the first diodes.

25. The rotor as recited in claim 1, wherein the diodes are located on a first terminal end of the rotor and the collecting rings are located on a second terminal end of the rotor opposite the first terminal end.

26. A brushless exciter for energising the field winding of a generator-rotor of a synchronous generator, comprising a rotor according to claim 1.

27. The brushless exciter as recited in claim 26, wherein the static field is a multipolar static field induced by at least one field winding fed with a direct current having 1 to 100 Ampere.

28. The brushless exciter as recited in claim 26, wherein the static field is a multipolar static field induced by at least one permanent magnet.

29. The brushless exciter as recited in claim 26, wherein the static field is a multipolar static field with m poles induced by a stator, wherein m is an integer even number in a range between 4 and 16.

30. The brushless exciter as recited in claim 26, wherein the rotor is mounted on a same shaft as the generator-rotor, wherein the first and second rings are located at a first side of the rotor facing the generator-rotor, and wherein the plurality of collecting rings are disposed at a second side of the rotor opposite the first side.

* * * * *